Jan. 3, 1950 W. H. BLISS 2,493,058
FREQUENCY DIVIDER
Filed Feb. 28, 1947
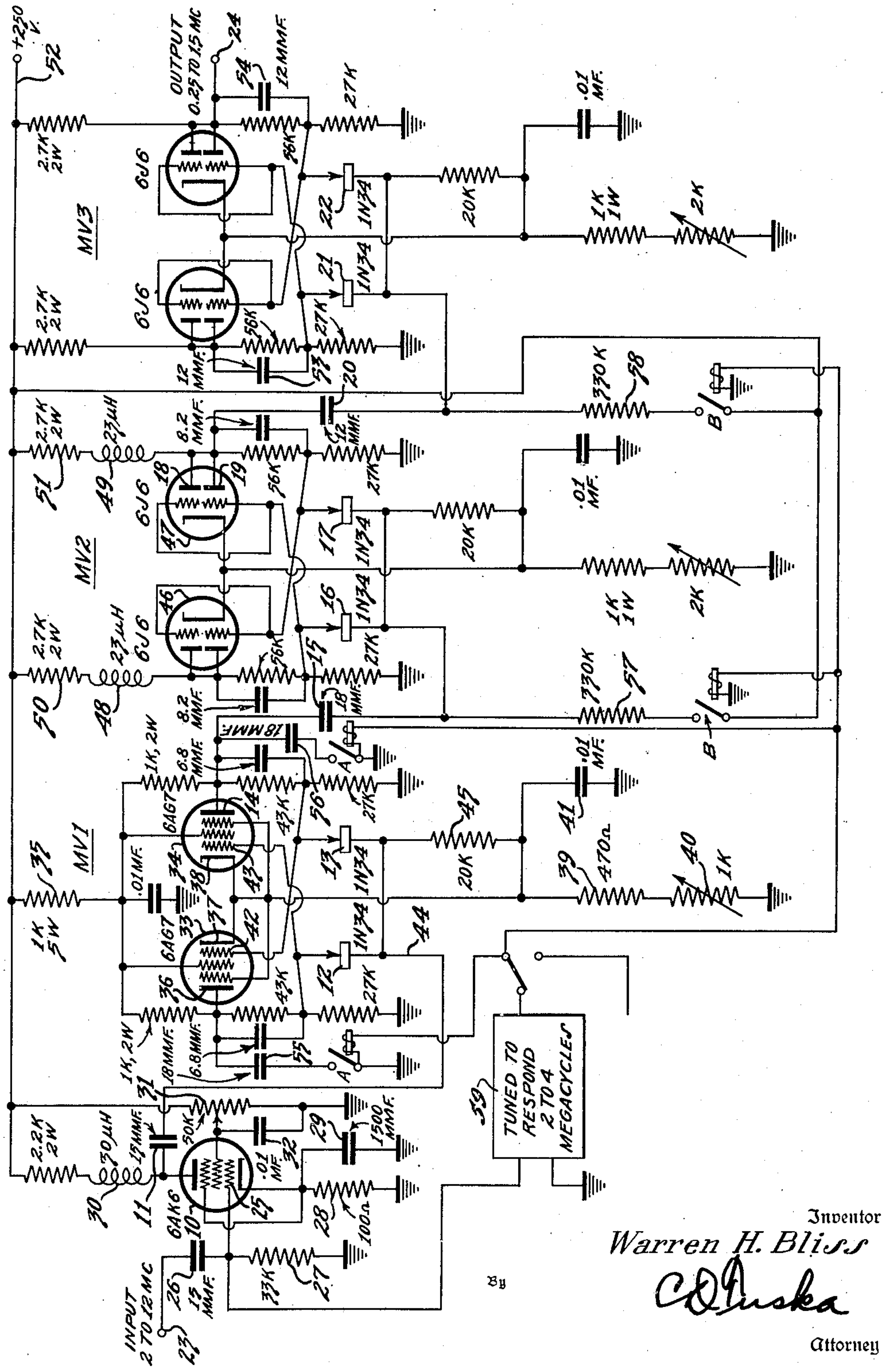
Inventor
Warren H. Bliss
By
C. D. Tuska
Attorney Patented Jan. 3, 1950 2,493,058

UNITED STATES PATENT OFFICE 2,493,058

FREQUENCY DIVIDER

Warren H. Bliss, Princeton, N. J., assignor to Radio Corporation of America, a corporation of Delaware Application February 28, 1947, Serial No. 731,670

4 Claims. (Cl. 250—36)

This invention relates to frequency dividing devices, and has for its principal object the provision of an improved frequency divider which involves no tuned circuits, is capable of reliable operation over a considerable range of relatively high frequencies with the least possible adjustment of its various constants, and is of relatively inexpensive construction.

Like some types of frequency dividers to be found in the prior art, the frequency divider of the present invention includes a driver or input stage which is followed by a plurality of binary stages or trigger circuits operating in tandem. Where such a frequency divider is required to operate over a range of frequencies of the order of 2 to 12 megacycles, for example, the result is not consistent unless various precautions are taken.

The principal difficulty is that of maintaining the desired frequency division ratio over the entire range of operating frequencies. Among the causes of this difficulty are (1) the rise in the gain of driver stage and the leading divider stages as the operating frequency is decreased, and (2) undesired tripping of the divider stages at the lower frequencies of the operating range.

The increase in the gain of the driver stage and the leading divider stages at the lower operating frequencies causes the divider stages to be over driven with the result that they fail to divide the frequency. Decrease in the operating frequency and the resulting long length or duration of the input and interstage drive pulses is likely to result in one or more of the stages being pulled or tripped back by the decay of its drive pulse.

Another important consideration in the design of a divider which is required to operation over a considerable range of frequencies is that of cost. Because the first divider stage is more complicated and requires more power for its operation than the following divider stages it is uneconomical to follow the customary practice of making all the divider stages of the same design.

In accordance with the present invention, each of the divider stages is provided with such circuit constants as are required to insure reliability of its operation over a predetermined part of its range of operating frequencies and means are provided for adjusting certain of these constants to extend this range of reliable operation. Thus each divider stage is made to respond accurately to its particular range of operating frequencies and the required division ratio between the input and output frequencies is maintained at all the required operating frequencies.

Important objects of the invention are the provision of a frequency divider which is capable of operation over a considerable range of high frequencies; the provision of a frequency divider wherein the divider stages are each adapted to handle the particular range of frequencies at which it is to be operated; and the provision of reliable and simply operated control means for extending the operational range of the leading driver stages which operate at the higher frequencies.

The invention will be better understood from the following description considered in connection with the accompanying drawing and its scope is indicated by the appended claims.

The single figure of the drawing is a wiring diagram of a frequency divider constructed in accordance with the invention to produce a division ratio of 8 over a range extending from 2 to 12 megacycles.

The illustrated frequency divider includes a driver stage 10 which has its anode coupled through a capacitor 11 and crystal rectifiers 12 and 13 to the first divider stage MV1. The divider stage MV1 has its anode 14 similarly coupled through a capacitor 15 and the crystal rectifiers 16 and 17 to the control grids of the second divider stage MV2. In the same manner, the divider stage MV2 has its anodes 18 and 19 coupled through a capacitor 20 and crystal rectifiers 21 and 22 to the control grids of the third divider stage MV3.

Alternating potential of the frequency to be divided is applied to an input terminal 23. Output potential of lower frequency is derived from the output terminal 24.

The driver stage tube 10 may be a miniature type pentode (6AK6). Input potential is applied to the control grid 25 of the tube 10 through a capacitor 26 and a resistor 27. Although negative bias voltage for the control grid 25 is obtained automatically by grid rectification, a small cathode resistor 28 shunted by a capacitor 29 is used to give protection in case of loss of excitation. A small inductance 30 in the anode lead compensates for the output capacitance and increases the output level at the higher frequencies. Over most of the operating frequency range the output of the driver stage 10 consists of negative peaks of clipped sine wave shape. A potentiometer 31 shunted in part by a capacitor 32 may be provided for adjusting the output level of the driver stage 10 but is not essential to satisfactory operation of this stage.

The three binary divider stages MV1, MV2 and

MV3 are similar in that each produces one output pulse for each two input pulses. This gives a division ratio of 8 for the three stages. The chief difference between the divider stages is in the design of each stage for the maximum speed at which it is required to operate.

Thus if the upper limit of the input frequency is to be 12 megacycles, for example, the first divider stage MV1 must be capable of operating at a maximum frequency of 12 megacycles, the second divider stage MV2 must be capable of operating at a maximum speed of 6 megacycles, and the third divider stage MV3 must be capable of operating at a maximum of 3 megacycles. To make all the divider stages of the same design would be uneconomical for the reason that the first stage MV1 is required to draw more power and necessarily is more complicated than the other stages need to be. In order to minimize the expanse of constructing the frequency divider, each divider stage is designed with reference to the frequency range over which it is required to operate.

The first stage MV1 is provided with a pair of type 6AG7 pentodes 33 and 34 in order to ensure reliable operation of 12 megacycles. A common plate resistor 35 is used to drop the anode voltage from +250 to about +180 volts. The swing in the voltage at the anodes 36 and 14 is from about +120 volts (zero bias) to about +175 volts (cutoff). The cathodes 37 and 38 are connected to ground through resistors 39 and 40 which are shunted by a capacitor 41. With these connections, the cathodes operate at about +60 volts. The stage is driven at the control grids 42 and 43 by a negative pulse applied from the anode of the driver stage tube 10 through capacitor 11 and the crystal rectifiers 12 and 13 which have their common lead 44 connected through a resistor 45 to the common terminal of the resistor 39 and the capacitor 41.

The second stage MV2 includes a pair of type 6J6 tubes 46 and 47 each having two triode elements which are connected in parallel. Sufficient speed for satisfactory operation of this stage is realized by connecting the anodes of the tube 46 to the power supply lead 52 through a peaking coil 48 and a resistor 50 and by similarly connecting the anodes of the tube 47 to the lead 52 through a peaking coil 49 and a resistor 51. The effect of these peaking coils is to speed up this stage. The remaining connections of the stage MV2 are similar to those of the stage MV1 with the exception that some of the constants are different as indicated by the legends adjacent the various circuit components.

The third stage MV3 differs from the stage MV2 in that the peaking coils are omitted and the anode-to-grid capacitors 53 and 54 are somewhat larger than the corresponding capacitors of the stage MV2.

It was found that the divider, insofar as described above, would not hold its division ratio of 8 over the entire frequency range from 12 down to 2 megacycles. This is due primarily to two effects. As the frequency decreases, the gain of the driver stage and the first two divider stages rises. This causes the divider stages to be over driven with the result that they fail to divide the frequency. Also as the frequency decreases, the length or duration of the input and interstage pulses, increases to such an extent that one or another of the divider stages is apt to be pulled or tripped back by the decay of its drive pulses. For these reasons, the divider, insofar as described above, can be relied on for satisfactory operation only over a range of input frequencies from 12 to 5 megacycles.

In order to extend its range of satisfactory operation, switches A—A are provided for connecting the capacitors 55 and 56 in the anode circuits of the tubes 33 and 34, and switches B—B are provided for connecting the resistors 57 and 58 in the control grid circuits of the last two stages. The effect of closing the switches A—A is to add capacitance to the anode circuits of the divider stage MV1 and decrease its operating speed. Closure of the switches B—B reduces the drive level to the stages MV2 and MV3 by putting more bias on the crystal rectifiers. Reliable operation is realized over a range of 2 to 5 megacycles with the switches A—A and B—B closed and over a range of 5 to 12 megacycles with these switches open.

If desired, the switches A—A and B—B may be ganged or controlled through a band responsive device 59 so that they are maintained closed only in response to input frequencies of 2 to 5 megacycles. Also they may be operated manually or may be ganged to the frequency switching coils of the oscillator from which the input pulses are derived.

With all the circuit constants established at the optimum values indicated by the legends adjacent the various circuit components, the control grid bias or the drive level of any one of the stages may be varied plus or minus 15 percent without causing failure or error. The same is true of the power supply voltage.

The frequency divider of the present invention is thus characterized (1) by the provision of divider stages which are each especially designed to satisfy the condition under which it is required to operate, (2) by the provision of means for slowing up the speed of leading divider stage during operation at the lower frequencies when the gain of the driver stage is high, and (3) by the provision of means for reducing the drive level of the later stages at such lower operating frequencies.

I claim as my invention:

1. The combination of means including a driver stage for delivering input pulses of a frequency varying over a predetermined range, a plurality of divider stages each including a pair of electron discharge elements having their anodes and grids cross-connected so that current conduction is stabilized in either one or the other of said elements and having circuits with constants such that each of said divider stages is operable over a different range of frequencies, means connecting said stages in tandem, means for applying said pulses to the first of said stages, switching means arranged to connect between ground and the anodes of the first of said stages capacitances of such value that the range of its operating frequencies is extended to be commensurate with the operating range of said driver stage, and means arranged to operate said switching means in response to a predetermined frequency.

2. The combination of means including a driver stage for delivering input pulses of a frequency varying over a predetermined range, a plurality of divider stages each including a pair of electron discharge elements having their anodes and grids cross-connected so that current conduction is stabilized in either one or the other of said elements and having circuits with constants such that each of said divider stages is operable over a different range of frequencies, means for applying operating potential to said anodes, means connecting said stages in tandem, means for applying said pulses to the first of said stages, a first switching means arranged to connect between ground and the anode circuits of the first of said stages capacitances of such value that the range of its operating frequencies is extended to be commensurate with the operating range of said driver stage, and a second switching means for connecting between said operating potential applying means and the input of the second of said stages a resistance of such value that the range of its operating frequencies is extended to be equal to one-half the extended range of said first divider stage.

3. The combination of means including a driver stage for delivering input pulses of a frequency varying over a predetermined range, a plurality of divider stages each including a pair of electron discharge elements having their anodes and grids cross-connected so that current conduction is stabilized in either one or the other of said elements and having circuits with constants such that each of said divider stages is operable over a different range of frequencies, means connecting said stages in tandem, means for applying said pulses to the first of said stages, means for applying operating potential to said anodes switching means arranged to connect between ground and the anode circuits of the first of said stages capacitances of such value that the range of its operating frequencies is extended to be commensurate with the operating range of said driver stage, means including a resistance arranged to be connected between said potential applying means and the input of said second stage for reducing the drive level of said second stage whereby the range of its operating frequencies is extended to be equal to one-half the extended range of said first divider stage, and means including resistances each arranged to be connected between said potential applying means and the input of a different one of the other of said stages for reducing the drive levels of said other stages whereby the ranges of their operating frequencies are extended so as to be different submultiples of the extended range of said first divider stage.

4. The combination of means for delivering input pulses of a frequency varying over a range of twelve to two megacycles, a frequency divider stage including a pair of electron discharge elements having their anodes and grids cross-connected so that current is conducted by one or the other of said elements in response to said pulses and having circuits with constants such that said divider stage is operable only over a frequency range of twelve to five megacycles, switching means arranged to change certain of said constants to values such that the operating range of said divider stage is extended to include frequencies between five and two megacycles, and means arranged to operate said switching means in response to pulses having a frequency of a predetermined value.

WARREN H. BLISS.

REFERENCES CITED

The following references are of record in the file of this patent:

UNITED STATES PATENTS

| Number | Name | Date |
|---|---|---|
| 2,266,401 | Reeves | Dec. 16, 1941 |
| 2,272,070 | Reeves | Feb. 3, 1942 |

OTHER REFERENCES

Lewis: "Proceedings of the Cambridge Philosophical Society," vol. 33, 1937, pages 549–558.